RICHARD G. HOBSON.
Improvement in Cotton Planters.
No. 120,742. Patented Nov. 7, 1871.
Fig. 1.
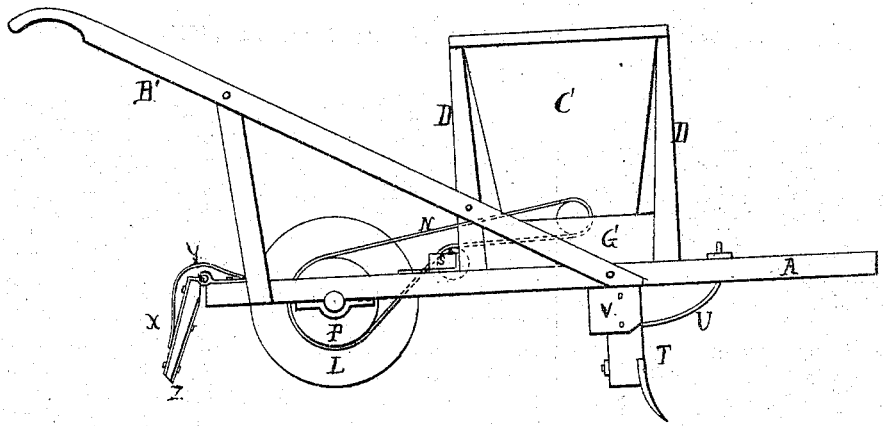
Fig. 2.
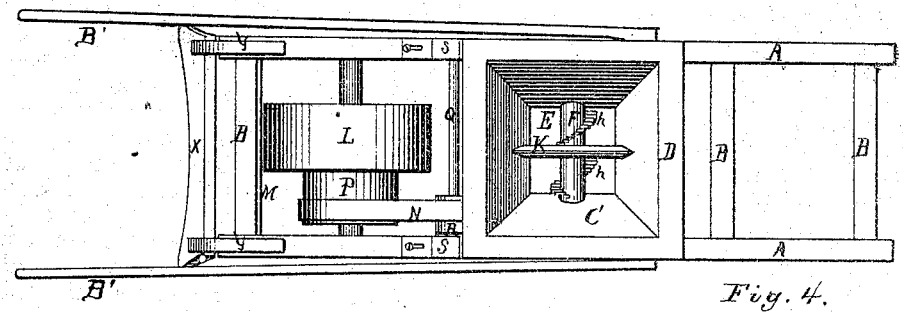
Fig. 5. Fig. 3. Fig. 4.
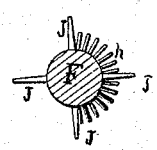 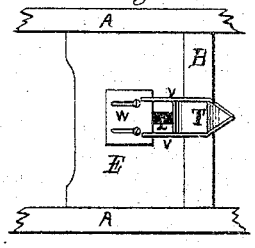
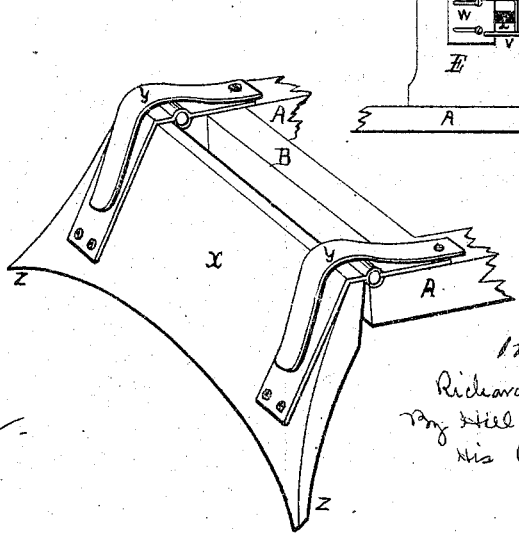
Witnesses. Inventor.
Dr. H. Ellsworth. Richard G. Hobson.
C. F. Brown. By Hill & Ellsworth
 His Attorneys

UNITED STATES PATENT OFFICE.

RICHARD G. HOBSON, OF HOULKA, MISSISSIPPI.

IMPROVEMENT IN COTTON-PLANTERS.

Specification forming part of Letters Patent No. 120,742, dated November 7, 1871.

*To all whom it may concern:*

Be it known that I, RICHARD G. HOBSON, of Houlka, in the county of Chickasaw and State of Mississippi, have invented an Improved Seed-Planter; and I do hereby declare the following to be a full, clear, and exact description of the same, reference being had to the accompanying drawing forming part of this specification, in which—

Figure 1 is a side elevation of my improved seed-planter. Fig. 2 is a top plan view of the same. Fig. 3 is a perspective view of the coverer, showing the means by which it is applied to the frame of the machine. Fig. 4 is a bottom plan view of the hopper, showing the method of regulating the flow of seed. Fig. 5 is a detached sectional view of the feed-shaft.

Similar letters of reference in the accompanying drawing denote the same parts.

My invention relates to that class of seed-planters which is designed more especially for planting cotton-seed, and has for its object to simplify and cheapen the construction of the same, and render their operation more perfect and certain. To this end the invention consists in the general construction of the machine and in the combination of various parts, as I will now proceed to describe.

The frame-work which supports the working parts of the machine is made rectangular in shape, and consists of the longitudinal side bars A, united by the transverse bars B, and is provided with suitable handles B', as shown. C is the hopper, made in the form of an inverted truncated pyramid, and mounted upon the frame at about the center thereof, being secured firmly in place by an exterior frame, D D, and bottom E. F is the feed-shaft, passing transversely through the hopper near its bottom, and having its bearings in the sills G of the exterior frame. *h h* are two series of short pins, arranged spirally around the shaft F in opposite directions, so as to feed the seed to the center of the hopper when the shaft is rotated. The shaft is further provided at its center, between the two series of pins *h* and immediately over the discharge-opening I in the hopper, with four radial arms, J, placed at equal distances apart, by which the seed is forced or discharged through the hopper as it is fed to the center by the spiral rows of pins. K is a bar firmly secured within the hopper immediately over the arms J, and at right angles to the feed-shaft. Its upper edge is beveled or sharpened, and lower edge in the arc of a circle, to prevent the passage of the radial arms. This bar is intended to divide the seed within the hopper, directing it outward toward the ends of the feed-shaft and preventing it from packing down upon and clogging the latter. L is the traction-and-covering wheel provided with a metal tire and hinge at the rear of the frame between the side bars A, such a distance from the rear cross-bar B as to receive the action of a scraper, M, secured to the under side of said cross-bar for the purpose of keeping the wheel free from the accumulation of dirt. Motion is communicated from the traction-wheel to the feed-shaft by means of a belt, N, passing over a pulley, P, upon the end of the feed-shaft outside the hopper. Q is a transverse shaft provided with an idle pulley, R, over which the belt passes, having its bearings in blocks S adapted for adjustment by any suitable means upon the frame between the traction-wheel and hopper. By adjusting the idle pulley through the medium of the blocks S the belt is readily tightened or loosened. T is the furrow-opener, secured centrally between the bars A to one of the transverse bars B, beneath the front side of the hopper, and braced from the adjoining cross-bar by the rod U. V are plates attached to the upper end of the furrow-opener upon opposite sides of the discharge-opening in the hopper, for the purpose of forming a guide or spout to conduct the seed into the furrow. The quantity of seed discharged from the hopper into this spout is regulated by a plate, W, upon the under side of the hopper, between the same and the plate V, as clearly shown in Fig. 4, which plate is adapted for adjustment to increase or diminish the size of the discharge-opening. X is a scraper or coverer hinged to the rear end of the machine, and held in a vertical or inclined position by means of the springs Y secured to the bars A in such a manner that their free ends shall press upon the back of the coverer, as shown in Fig. 3. The lower edge of the coverer is curved upward in the arc of a circle so that its projecting ends Z shall move the dirt toward the center and thus form a slightly raised bed over the planted seed to facilitate after cultivation.

The operation of planting is as follows: The machine being set in motion, the furrow-opener opens the ground to receive the seed as it drops from the hopper. The traction-wheel, following in the path of the furrow-opener, covers the seed to the requisite depth, and the scraper or coverer X smooths off the bed and completes the operation. By holding the coverer to its work with springs it bears upon the ground with a yielding pressure, and therefore passes freely over all obstructions and conforms to the inequalities of the ground.

Having thus described my invention, what I claim as new therein, and desire to secure by Letters Patent, is—

1. The seed-plow T to open the furrow, a roller to press down the earth after the seeds are deposited therein, followed by a spring coverer and ridger, X, substantially as and for the purpos specified.

2. In combination with the hopper, the dividing-bar K, and the feed-shaft provided with the radial feed-arms J, and the two sets of spirally-arranged pins $h\ h$, substantially as described, for the purpose specified.

3. The feed-shaft, constructed as described, with the central radial feed-arms J, and the two sets of pins $h\ h$, arranged spirally around and upon said shaft in opposite directions, substantially as described, for the purpose specified.

RICHARD G. HOBSON.

Witnesses:
MILTON A. CARLISLE,
THOS. HIGHTOWER.

(133)